United States Patent
Zhang et al.

(10) Patent No.: US 11,678,340 B2
(45) Date of Patent: Jun. 13, 2023

(54) TIMING ADVANCE COMMAND IN DOWNLINK CONTROL INFORMATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/137,123

(22) Filed: Dec. 29, 2020

(65) Prior Publication Data

US 2021/0243732 A1 Aug. 5, 2021

Related U.S. Application Data

(60) Provisional application No. 62/968,679, filed on Jan. 31, 2020.

(51) Int. Cl.
*H04W 72/23* (2023.01)
*H04W 72/21* (2023.01)

(52) U.S. Cl.
CPC ........... *H04W 72/23* (2023.01); *H04W 72/21* (2023.01)

(58) Field of Classification Search
CPC ........... H04W 72/042; H04W 72/0413; H04W 56/0045
See application file for complete search history.

(56) References Cited

U.S. PATENT DOCUMENTS

2010/0118777 A1* 5/2010 Yamada ................ H04L 5/0057
370/328
2013/0083739 A1* 4/2013 Yamada .............. H04W 74/006
370/329
(Continued)

FOREIGN PATENT DOCUMENTS

EP 3435719 A1 1/2019
WO WO-2019032835 A1 2/2019
(Continued)

OTHER PUBLICATIONS

Ericsson: "UE Timing Advance Adjustment Test Test for Category NB1 UE Standalone Under Enhanced Coverage", 3GPP Draft, 3GPP TSG-RAN WG4 Meeting #89, 36133_CR6119R1_(REL-15)_ R4-1816070, 3rd Generation Partnership Project (3GPP), Mobile Competence Centre, 650, Route Des Lucioles, F-06921, Sophia-Antipolis, Cedex, France, vol. RAN WG4, No. Spokane, USA, Nov. 12, 2018-Nov. 16, 2018, Dec. 9, 2018 (Dec. 9, 2018), XP051552664, 3 pages, Retrieved from the Internet: URL:http://www.3gpp.org/ftp/Meetings%5F3GPP%5FSYNC/RAN/Docs/RP%2D182367%2Ezip [retrieved on Dec. 9, 2018], p. 2, lines 21-26.
(Continued)

*Primary Examiner* — Ayaz R Sheikh
*Assistant Examiner* — Tarell A Hampton
(74) *Attorney, Agent, or Firm* — Harrity & Harrity, LLP

(57) ABSTRACT

Various aspects of the present disclosure generally relate to wireless communication. In some aspects, a user equipment (UE) may receive, in one or more downlink resources, a timing advance command in downlink control information; and implement the timing advance command after an action time period commencing from receipt of the timing advance command elapses. Numerous other aspects are provided.

30 Claims, 5 Drawing Sheets

(56) References Cited

U.S. PATENT DOCUMENTS

| | | | |
|---|---|---|---|
| 2018/0205516 A1* | 7/2018 | Jung | H04W 74/0833 |
| 2019/0313407 A1* | 10/2019 | Tsai | H04W 72/0453 |
| 2019/0342845 A1* | 11/2019 | Laselva | H04L 1/1812 |
| 2020/0351844 A1* | 11/2020 | Rico Alvarino | H04L 1/189 |
| 2022/0086786 A1* | 3/2022 | Narasimha | H04W 56/0005 |

FOREIGN PATENT DOCUMENTS

| | | | | |
|---|---|---|---|---|
| WO | WO-2020001277 A1 | | 1/2020 | |
| WO | WO-2020154744 A1 | * | 7/2020 | H04B 7/26 |

OTHER PUBLICATIONS

International Search Report and Written Opinion—PCT/US2020/067667—ISA/EPO—dated Apr. 13, 2021.

SHARP: "Correction to Transmission Timing Adjustments in TS 38.213", 3GPP Draft, 3GPP TSG-RAN1 Meeting #96, 38213_CR0034_(REL-15)_R1-1903814, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Mar. 13, 2019 (Mar. 13, 2019), XP051690325, 4 pages, Retrieved from the Internet: URL:http://www.3gpp.org/ftp/tsg%5Fran/TSG%5FRAN/TSGR%5F83/Docs/RP%2D190449%2Ezip [retrieved on Mar. 13, 2019], p. 3, line 3-p. 4, line 10.

* cited by examiner

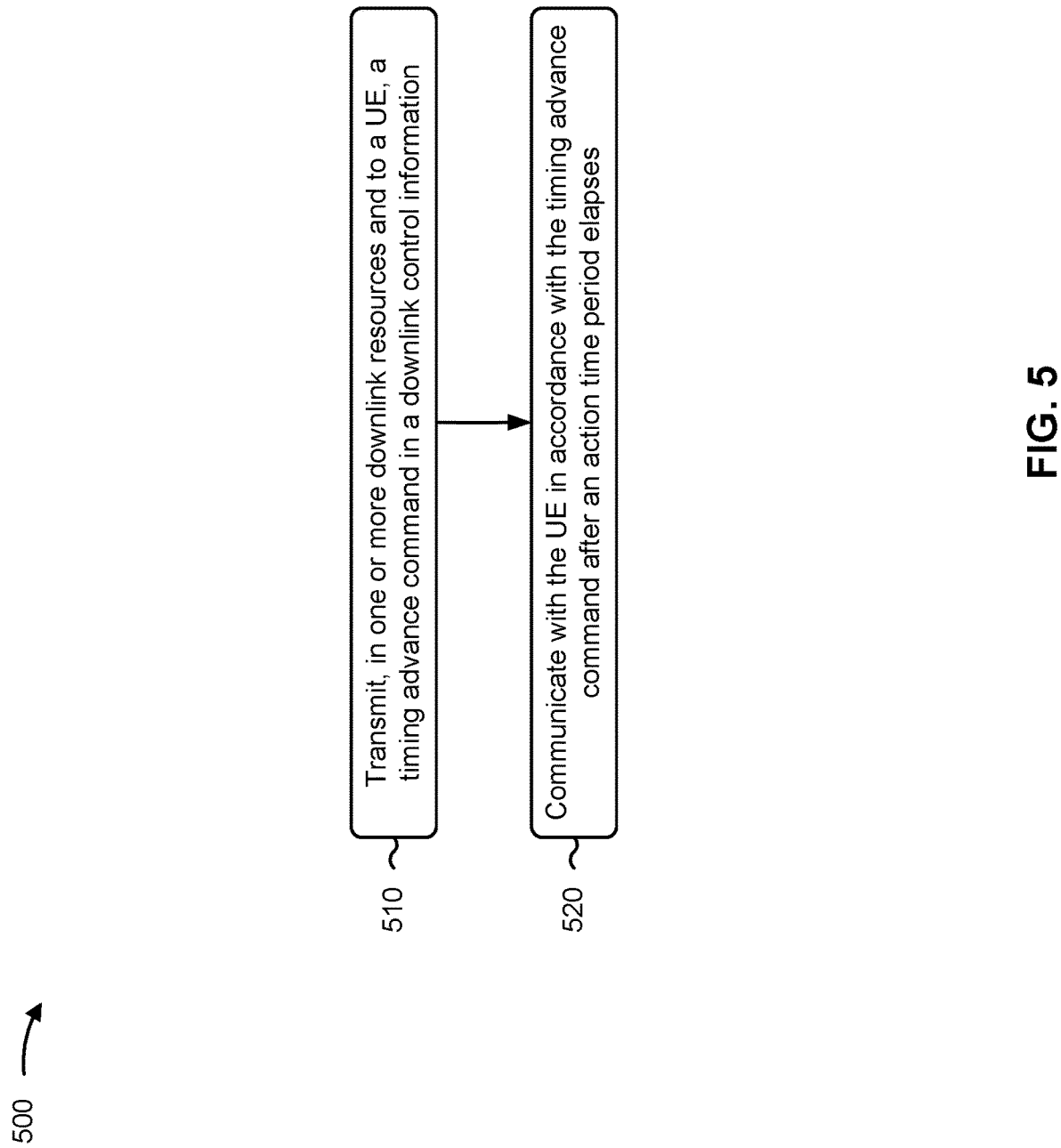

TIMING ADVANCE COMMAND IN DOWNLINK CONTROL INFORMATION

CROSS-REFERENCE TO RELATED APPLICATION

This Patent Application claims priority to U.S. Provisional patent Application No. 62/968,679, filed on Jan. 31, 2020, entitled "TIMING ADVANCE COMMAND IN DOWNLINK CONTROL INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a timing advance command in downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, in one or more downlink resources, a timing advance command in downlink control information; and implementing the timing advance command after an action time period commencing from receipt of the timing advance command elapses.

In some aspects, a method of wireless communication, performed by a base station (BS), may include transmitting, in one or more downlink resources and to a UE, a timing advance command in downlink control information; and communicating with the UE in accordance with the timing advance command after an action time period elapses.

In some aspects, a UE for wireless communication may include a memory and one or more processors operatively coupled to the memory. The memory and the one or more processors may be configured to receive, in one or more downlink resources, a timing advance command in downlink control information; and implement the timing advance command after an action time period commencing from receipt of the timing advance command elapses.

In some aspects, a BS for wireless communication may include a memory and one or more processors operatively coupled to the memory. The memory and the one or more processors may be configured to transmit, in one or more downlink resources and to a UE, a timing advance command in downlink control information; and communicate with the UE in accordance with the timing advance command after an action time period elapses.

In some aspects, a non-transitory computer-readable medium may store one or more instructions for wireless communication. The one or more instructions, when executed by one or more processors of a UE, may cause the one or more processors to receive, in one or more downlink resources, a timing advance command in downlink control information; and implement the timing advance command after an action time period commencing from receipt of the timing advance command elapses.

In some aspects, a non-transitory computer-readable medium may store one or more instructions for wireless communication. The one or more instructions, when executed by one or more processors of a BS, may cause the one or more processors to transmit, in one or more downlink resources and to a UE, a timing advance command in downlink control information; and communicate with the UE in accordance with the timing advance command after an action time period elapses.

In some aspects, an apparatus for wireless communication may include means for receiving, in one or more downlink resources, a timing advance command in downlink control information; and means for implementing the timing advance command after an action time period commencing from receipt of the timing advance command elapses.

In some aspects, an apparatus for wireless communication may include means for transmitting, in one or more downlink resources and to a user equipment (UE), a timing advance command in downlink control information; and means for communicating with the UE in accordance with the timing advance command after an action time period elapses.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
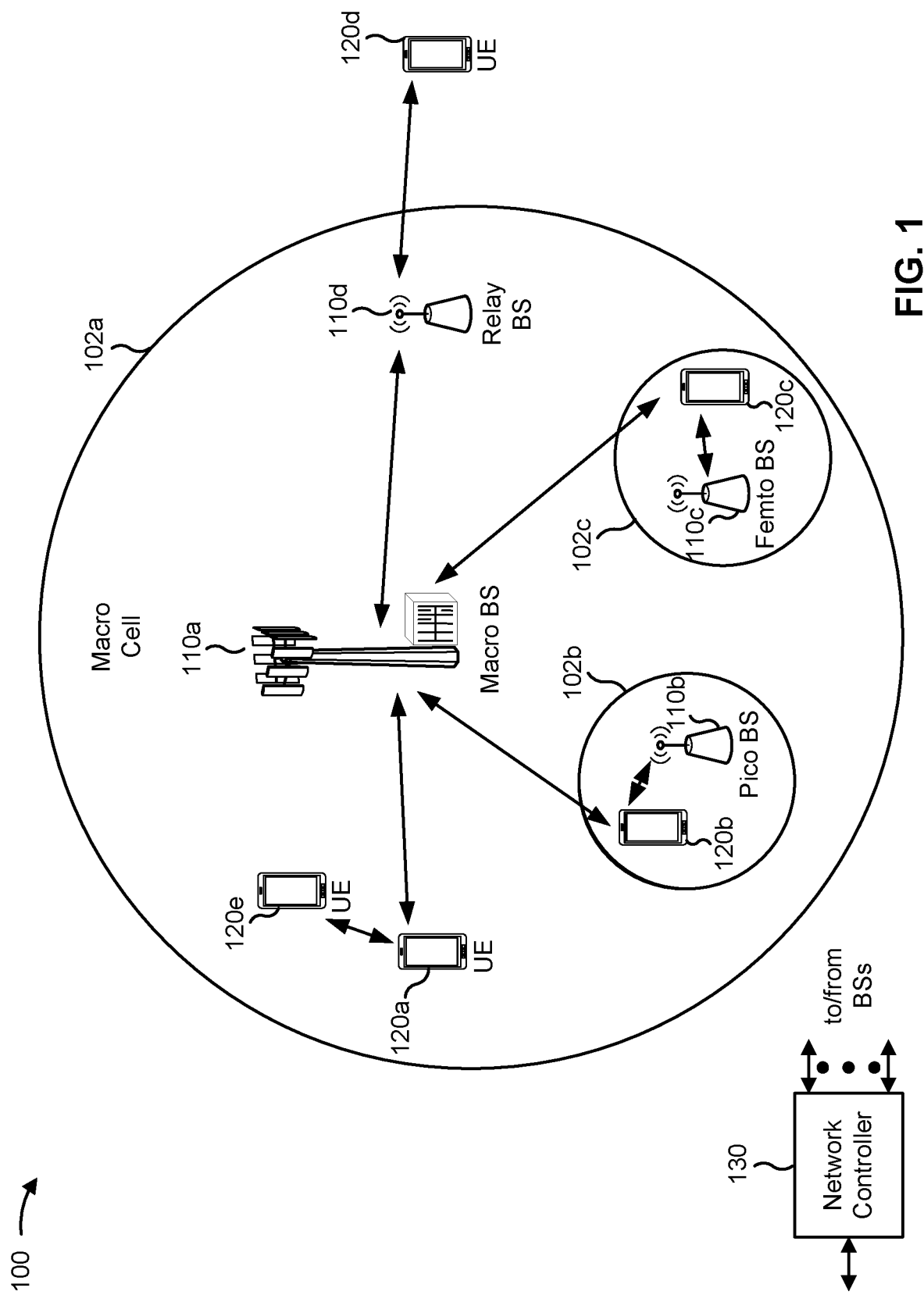
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
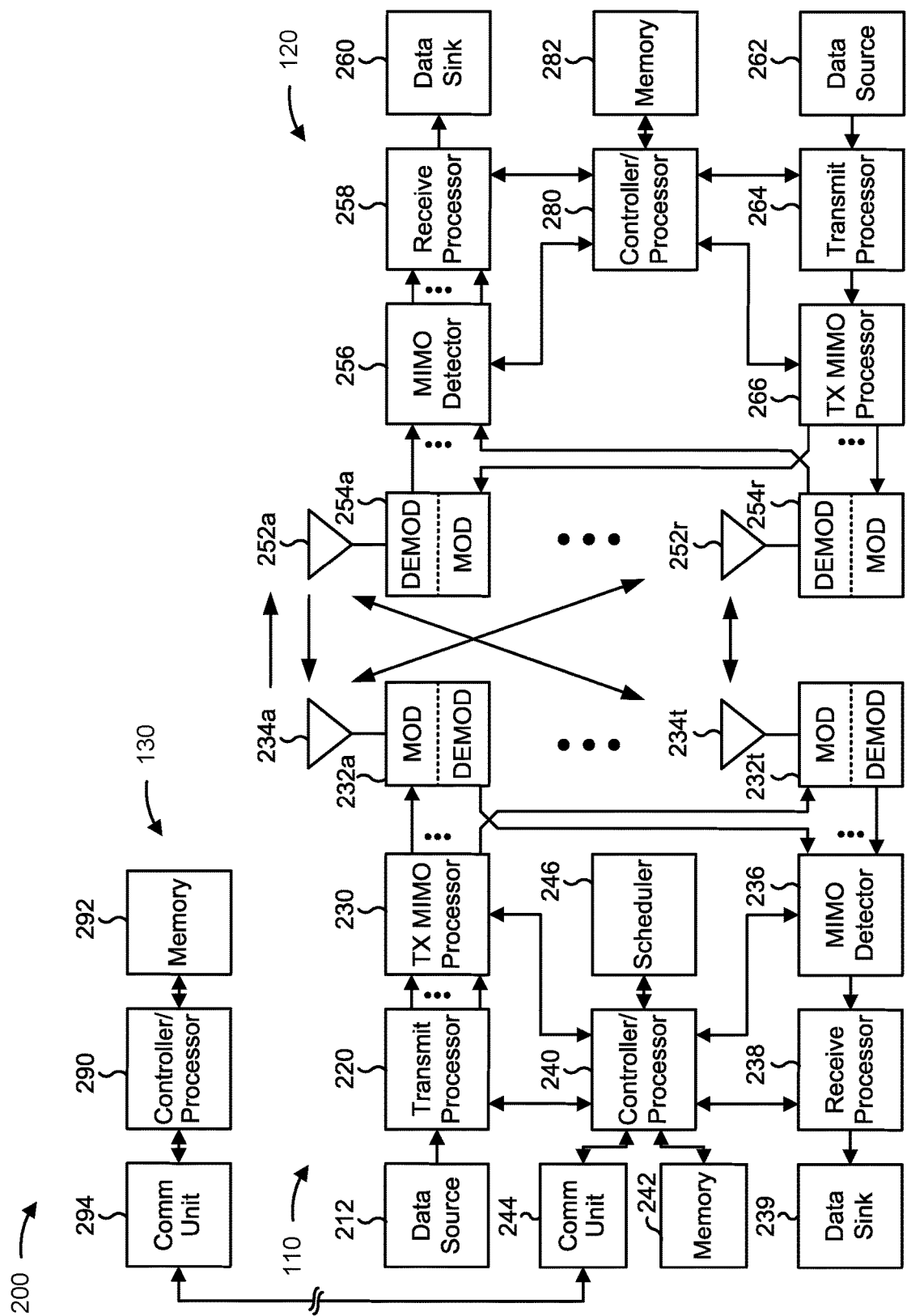
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a timing advance command in downlink control information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving, in one or more downlink resources, a timing advance command in downlink control information, means for implementing the timing advance command after an action time period commencing from receipt of the timing advance command elapses, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, in one or more downlink resources and to a UE (e.g., UE 120), a timing advance command in downlink control information, means for communicating with the UE in accordance with the timing advance command after an action time period elapses, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a BS may transmit a timing advance command to indicate a change to a timing that a UE is to use for communication with the BS and/or other network devices within a network. For example, the BS may transmit a timing advance command, to the UE, in a medium access control (MAC) control element (CE) of a physical downlink control channel (PDCCH). In this case, the UE may implement the timing advance command after a threshold period of time, which may be termed an action time or action time period. For a MAC CE in a PDCCH, the action time may be defined as a particular quantity of slots after an end of an uplink slot that overlaps with a downlink slot in which the UE receives the timing advance command in the MAC CE of the PDCCH. In this case, an uplink slot subcarrier spacing for the action time may be a minimum subcarrier spacing of a set of subcarrier spacings configured for a set of uplink bandwidth parts for a set of uplink carriers in a timing advance group associated with a physical downlink shared channel (PDSCH) transmission corresponding to the PDCCH. However, the action time may not be defined for other signaling paths.

Some aspects described herein enable a timing advance command in downlink control information (DCI). For example, a UE may receive, from a BS, a timing advance command in downlink control information, and may implement the timing advance command after an action time period elapses. In this case, the action time period may be defined based at least in part on the timing advance command being received via downlink control information resulting in a different timing advance command implementation delay than is used for, for example, a MAC CE conveyed timing advance command. In this way, the UE and the BS enable downlink control information based signaling of a timing advance command, thereby enabling synchronized communication in a scenario where it may not be advantageous or possible to convey a timing advance command in a MAC CE.

Figure 3:
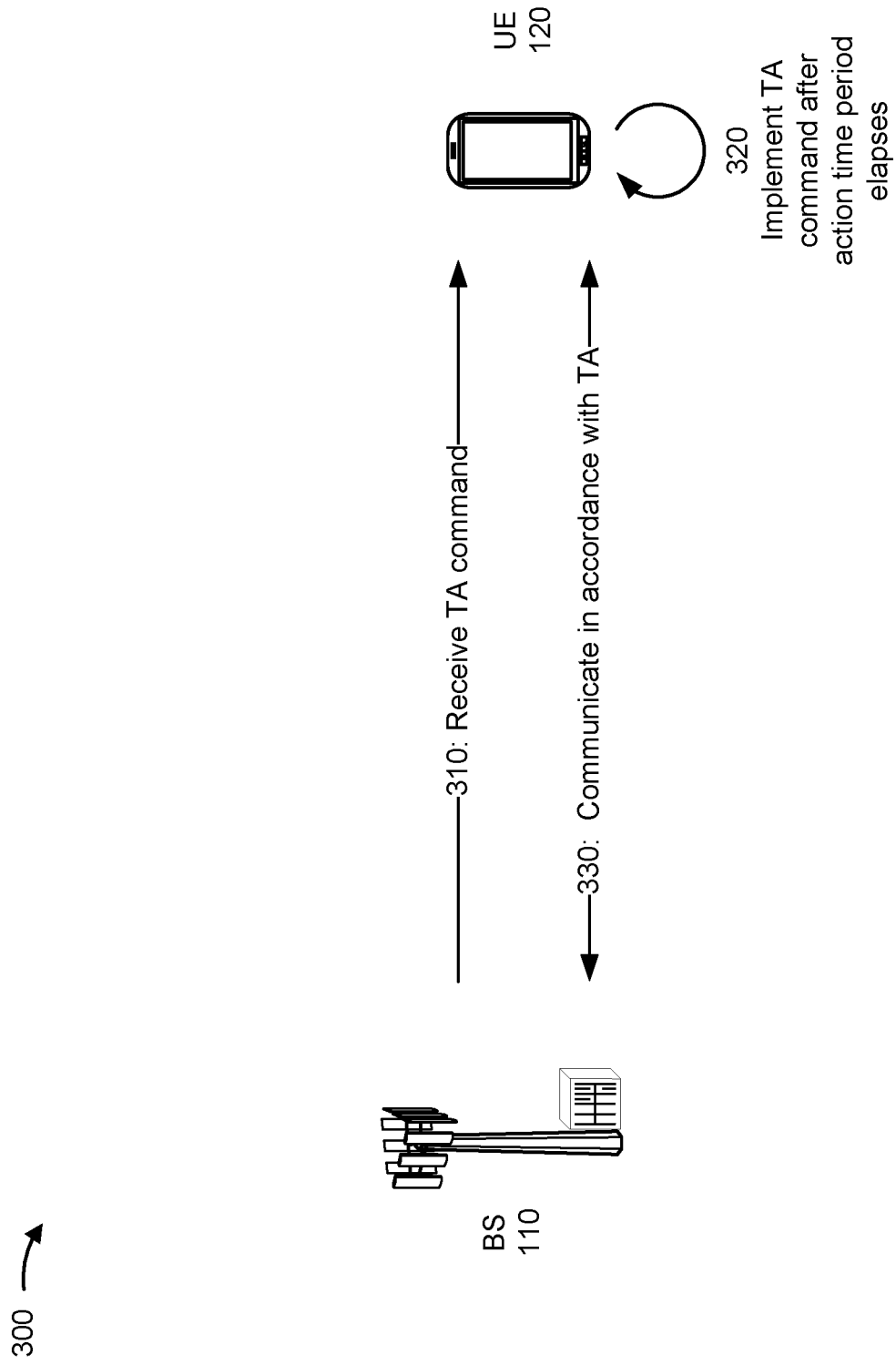
FIG. 3 is a diagram illustrating an example of a timing advance command in downlink control information, in accordance with various aspects of the present disclosure.

FIG. 3 is a diagram illustrating an example 300 of a timing advance command, in accordance with various aspects of the present disclosure. As shown in FIG. 3, example 300 includes a BS 110 and a UE 120.

As further shown in FIG. 3, and by reference number 310, UE 120 may receive a timing advance command. For example, UE 120 may receive the timing advance command in downlink control information in one or more downlink resources (e.g., one or more symbols, mini-slots, slots, and/or the like). In some aspects, UE 120 may transmit a feedback message as a response to receiving the downlink control information. For example, based at least in part on receiving the downlink control information, UE 120 may transmit an acknowledgement (ACK) message in one or more uplink resources (e.g., one or more symbols, mini-slots, slots, and/or the like) to indicate that the downlink control information and/or timing advance command is received.

As further shown in FIG. 3, and by reference number 320, UE 120 may implement the timing advance command after an action time period elapses. For example, UE 120 may delay implementing the timing advance command during an action time period, thereby ensuring synchronization with BS 110 and/or one or more other network devices within a network. In some aspects, UE 120 may determine an action time based at least in part on a specification that defines the action time. For example, UE 120 may store information identifying the action time and/or one or more parameters for determining the action time (e.g., a parameter indicating a quantity of symbols that UE 120 is to delay from an identified start time).

Additionally, or alternatively, the action time period may be based at least in part on a downlink resource in which UE 120 receives the timing advance command. For example, UE 120 may delay implementing the timing advance command by a threshold amount of time from an end of an uplink resource that overlaps with an end of a last downlink resource in which the downlink control information is received. In other words, UE 120 may delay implementing the timing advance command by a particular quantity of symbols (or slots or mini-slots), such that the particular quantity of symbols starts at the end of an uplink symbol that overlaps with a last downlink symbol in which the downlink control information is received.

Additionally, or alternatively, the action time period may be based at least in part on a transmission of the acknowledgement message. For example, UE 120 may delay implementing the timing advance command for a threshold period of time from an end of a last uplink resource in which UE 120 transmits the acknowledgement message to confirm reception of the timing advance command in the downlink control information.

In some aspects, UE 120 may determine a subcarrier spacing to identify a length of a quantity of resources that UE 120 is to delay implementing the timing advance command. For example, when UE 120 is to delay implementing the timing advance command for a threshold period of time, the threshold period of time (e.g., symbols, slots, mini-slots, and/or the like) may be based at least in part on a subcarrier spacing of the network. In this case, UE 120 may determine the subcarrier spacing based at least in part on a minimum subcarrier spacing of a set of subcarrier spacings of a set of configured uplink bandwidth parts (e.g., all uplink bandwidth parts, one or more uplink bandwidth parts, and/or the like) for a set of uplink carriers (e.g., all uplink carriers, one or more uplink carriers, and/or the like) in a timing advance group (TAG) in which UE 120 is communicating.

Additionally, or alternatively, UE 120 may determine the length of the quantity of resources based at least in part on a plurality of factors. For example, UE 120 may determine a first component, of the length of time, based at least in part on a minimum quantity of symbols (e.g., a minimum required quantity of symbols based at least in part on a UE capability or a network capability) from an end of a PDCCH, which conveys the downlink control information, to a start of a physical uplink control channel (PUCCH), which is to convey an acknowledgment message or negative acknowledgement message. Similarly, UE 120 may determine a second component, of the length of time, based at least in part on a minimum quantity of symbols (e.g., a minimum required quantity of symbols based at least in part on a UE capability or a network capability) from an end of a scheduling downlink control information to a start of a corresponding scheduled physical uplink shared channel (PUSCH).

In this case, a subcarrier spacing of the first component and the second component may be based at least in part on a minimum subcarrier spacing of a set of subcarrier spacings of a set of configured uplink bandwidth parts of a set of uplink carriers in a timing advance group in which UE 120 is communicating. Additionally, or alternatively, the subcarrier spacing of the first component and the second component may be based at least in part on a minimum subcarrier spacing of a set of subcarrier spacings of a set of configured downlink bandwidth parts of a set of downlink carriers corresponding to the aforementioned configured set of uplink carriers.

Similarly, UE 120 may determine a third component, of the length of time, based at least in part on a maximum signaled timing advance value. In this case, a subcarrier spacing for the maximum signaled timing advance value may be based at least in part on a minimum subcarrier spacing of a set of subcarrier spacings of a set of configured uplink bandwidth parts of a set of uplink carriers in a timing advance group in which UE 120 is communicating. Additionally, or alternatively, the subcarrier spacing of the third component may be based at least in part on a minimum subcarrier spacing of a set of subcarrier spacings of a set of configured initial uplink bandwidth parts identified in an initial uplink bandwidth part configuration message received by UE 120.

In some aspects, UE 120 may determine the timing advance value as a function of the three components. For example, UE 120 may determine the timing advance value based at least in part on a largest of the three components, a smallest of the three components, an average of the three components, a combination the three components, and/or the like. Additionally, or alternatively, UE 120 may determine the timing advance value based at least in part on a single component, two components (e.g., a smallest value, largest value, average value, and/or the like), and/or the like.

As further shown in FIG. 3, and by reference number 330, UE 120 may communicate with BS 110 based at least in part on implementing the timing advance command. For example, UE 120 may transmit on an uplink and/or receive on a downlink in accordance with a timing configuration associated with the timing advance command. In some aspects, UE 120 may communicate before implementing the timing advance command using a first timing configuration and may communicate after implementing the timing advance command using a second timing configuration (e.g., identified based at least in part on the timing advance command), which is different from the first timing configuration.

As indicated above, FIG. 3 is provided as an example. Other examples may differ from what is described with respect to FIG. 3.

Figure 4:
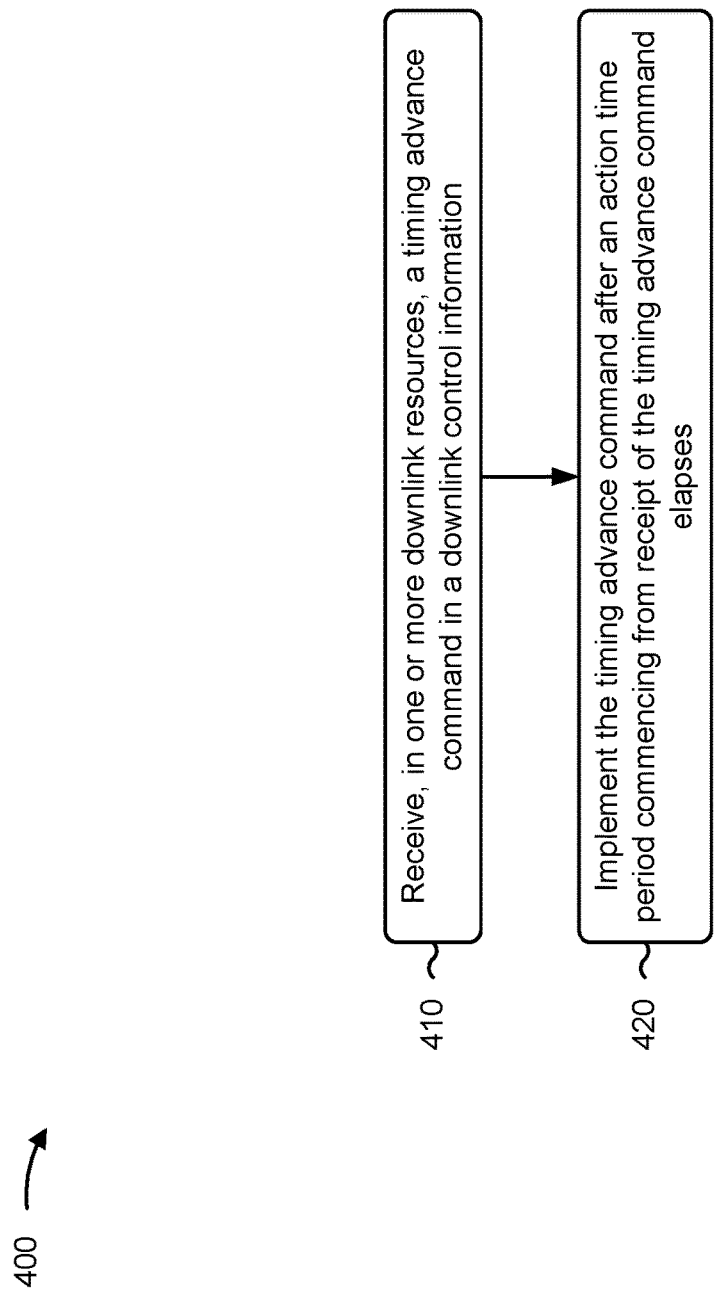
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with a timing advance command in downlink control information.

As shown in FIG. 4, in some aspects, process 400 may include receiving, in one or more downlink resources, a timing advance command in downlink control information (block 410). For example, the UE (e.g., using receive processor 258, transmit processor 264, controller/processor 280, memory 282, and/or the like) may receive, in one or more downlink resources, a timing advance command in downlink control information, as described above.

As further shown in FIG. 4, in some aspects, process 400 may include implementing the timing advance command after an action time period commencing from receipt of the timing advance command elapses (block 420). For example, the UE (e.g., using receive processor 258, transmit processor 264, controller/processor 280, memory 282, and/or the like) may implement the timing advance command after an action time period commencing from receipt of the timing advance command elapses, as described above.

Process 400 may include additional aspects, such as any single aspect or any combination of aspects described below and/or in connection with one or more other processes described elsewhere herein.

In a first aspect, the action time period is defined in a specification.

In a second aspect, alone or in combination with the first aspect, the action time period elapses a threshold quantity of time after an end of an uplink resource, the uplink resource overlaps with a last downlink resource, of the one or more downlink resources, in which the timing advance command is received.

In a third aspect, alone or in combination with one or more of the first and second aspects, process 400 includes transmitting, in one or more uplink resources, an acknowledgement message as a response to the downlink control information, wherein the action time period elapses a threshold quantity of time after an end of a last uplink resource, of the one or more is uplink resources, in which the acknowledgement message is transmitted.

In a fourth aspect, alone or in combination with one or more of the first through third aspects, the action time period is a threshold quantity of symbols or slots.

In a fifth aspect, alone or in combination with one or more of the first through fourth aspects, a subcarrier spacing of the action time period is based at least in part on a minimum subcarrier spacing of a set of configured uplink bandwidth parts of a set of uplink carriers in a timing advance group of the UE.

In a sixth aspect, alone or in combination with one or more of the first through fifth aspects, the action time period is based at least in part on at least one of a first component, a second component, and a third component.

In a seventh aspect, alone or in combination with one or more of the first through sixth aspects, the first component is a minimum required quantity of symbols from an end of a physical downlink control channel that conveys the downlink control information to a start of a physical uplink control channel conveying an acknowledgement message.

In an eighth aspect, alone or in combination with one or more of the first through seventh aspects, the second component is a minimum required quantity of symbols from an end of a scheduling downlink control information to a start of a scheduled physical downlink shared channel.

In a ninth aspect, alone or in combination with one or more of the first through eighth aspects, a subcarrier spacing of first component and the second component is determined based at least in part on a minimum subcarrier spacing of a set of subcarrier spacings, the set of subcarrier spacings includes one or more subcarrier spacings of a set of configured uplink bandwidth parts of a set of uplink carriers in a timing advance group, and the set of subcarrier spacings includes one or more subcarrier spacings of a set of configured downlink bandwidth parts for a set of downlink carriers corresponding to the set of uplink carriers.

In a tenth aspect, alone or in combination with one or more of the first through ninth aspects, the third component is a maximum value of the timing advance command.

In an eleventh aspect, alone or in combination with one or more of the first through tenth aspects, the third component is determined based at least in part on a minimum subcarrier spacing of a set of subcarrier spacings, the set of subcarrier spacings includes one or more subcarrier spacings of a set of configured uplink bandwidth parts of a set of uplink carriers in a timing advance group, and the set of subcarrier spacings includes one or more subcarrier spacings of a set of configured initial uplink bandwidth parts of an initial uplink bandwidth part configuration message.

In a twelfth aspect, alone or in combination with one or more of the first through eleventh aspects, receiving the timing advance command in the downlink control information includes receiving the timing advance command in the downlink control information of a physical downlink control channel.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a BS, in accordance with various aspects of the present disclosure. Example process 500 is an example where the BS (e.g., BS 110 and/or the like) performs operations associated with a timing advance command in downlink control information.

As shown in FIG. 5, in some aspects, process 500 may include transmitting, in one or more downlink resources and to a UE, a timing advance command in downlink control information (block 510). For example, the BS (e.g., using transmit processor 220, receive processor 238, controller/processor 240, memory 242, and/or the like) may transmit, in one or more downlink resources and to a UE, a timing advance command in downlink control information, as described above.

As further shown in FIG. 5, in some aspects, process 500 may include communicating with the UE in accordance with the timing advance command after an action time period elapses (block 520). For example, the BS (e.g., using transmit processor 220, receive processor 238, controller/processor 240, memory 242, and/or the like) may communicate with the UE in accordance with the timing advance command after an action time period elapses, as described above.

Process 500 may include additional aspects, such as any single aspect or any combination of aspects described below and/or in connection with one or more other processes described elsewhere herein.

In a first aspect, the action time period is defined in a specification.

In a second aspect, alone or in combination with the first aspect, the action time period elapses a threshold quantity of time after an end of an uplink resource, the uplink resource overlaps with a last downlink resource, of the one or more downlink resources, in which the timing advance command is received.

In a third aspect, alone or in combination with one or more of the first and second aspects, process 500 includes receiving, in one or more uplink resources and from the UE, an acknowledgement message as a response to the downlink control information, wherein the action time period elapses a threshold quantity of time after an end of a last uplink resource, of the one or more is uplink resources, in which the acknowledgement message is transmitted.

In a fourth aspect, alone or in combination with one or more of the first through third aspects, the action time period is a threshold quantity of symbols or slots.

In a fifth aspect, alone or in combination with one or more of the first through fourth aspects, a subcarrier spacing of the action time period is based at least in part on a minimum subcarrier spacing of a set of configured uplink bandwidth parts of a set of uplink carriers in a timing advance group of the UE.

In a sixth aspect, alone or in combination with one or more of the first through fifth aspects, the action time period is based at least in part on at least one of a first component, a second component, and a third component.

In a seventh aspect, alone or in combination with one or more of the first through sixth aspects, the first component is a minimum required quantity of symbols from an end of a physical downlink control channel that conveys the downlink control information to a start of a physical uplink control channel conveying an acknowledgement message.

In an eighth aspect, alone or in combination with one or more of the first through seventh aspects, the second component is a minimum required quantity of symbols from an end of a scheduling downlink control information to a start of a scheduled physical downlink shared channel.

In a ninth aspect, alone or in combination with one or more of the first through eighth aspects, a subcarrier spacing of first component and the second component is determined based at least in part on a minimum subcarrier spacing of a set of subcarrier spacings, the set of subcarrier spacings includes one or more subcarrier spacings of a set of configured uplink bandwidth parts of a set of uplink carriers in a timing advance group, and the set of subcarrier spacings includes one or more subcarrier spacings of a set of configured downlink bandwidth parts for a set of downlink carriers corresponding to the set of uplink carriers.

In a tenth aspect, alone or in combination with one or more of the first through ninth aspects, the third component is a maximum value of the timing advance command.

In an eleventh aspect, alone or in combination with one or more of the first through tenth aspects, the third component is determined based at least in part on a minimum subcarrier spacing of a set of subcarrier spacings, the set of subcarrier spacings includes one or more subcarrier spacings of a set of configured uplink bandwidth parts of a set of uplink carriers in a timing advance group, and the set of subcarrier spacings includes one or more subcarrier spacings of a set of configured initial uplink bandwidth parts of an initial uplink bandwidth part configuration message.

In a twelfth aspect, alone or in combination with one or more of the first through eleventh aspects, transmitting the timing advance command in the downlink control information includes transmitting the timing advance command in the downlink control information of a physical downlink control channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: receiving, in one or more downlink resources, a timing advance command in downlink control information; and implementing the timing advance command after an action time period commencing from receipt of the timing advance command elapses.

Aspect 2: The method of aspect 1, wherein receiving the timing advance command in the downlink control information comprises: receiving the timing advance command in the downlink control information of a physical downlink control channel.

Aspect 3: The method of any of aspects 1 to 2, wherein the action time period is defined in a specification.

Aspect 4: The method of any of aspects 1 to 3, wherein the action time period elapses a threshold quantity of time after an end of an uplink resource, wherein the uplink resource overlaps with a last downlink resource, of the one or more downlink resources, in which the timing advance command is received.

Aspect 5: The method of any of aspects 1 to 4, further comprising: transmitting, in one or more uplink resources, an acknowledgement message as a response to the downlink control information, wherein the action time period elapses a threshold quantity of time after an end of a last uplink resource, of the one or more uplink resources, in which the acknowledgement message is transmitted.

Aspect 6: The method of any of aspects 1 to 5, wherein the action time period is a threshold quantity of symbols or slots.

Aspect 7: The method of any of aspects 1 to 6, wherein a subcarrier spacing of the action time period is based at least in part on a minimum subcarrier spacing of a set of configured uplink bandwidth parts of a set of uplink carriers in a timing advance group of the UE.

Aspect 8: The method of any of aspects 1 to 7, wherein the action time period is based at least in part on at least one of a first component, a second component, and a third component.

Aspect 9: The method of aspect 8, wherein the first component is a minimum required quantity of symbols from an end of a physical downlink control channel that includes the downlink control information to a start of a physical uplink control channel conveying an acknowledgement message.

Aspect 10: The method of any of aspects 8 to 9, wherein the second component is a minimum required quantity of symbols from an end of a scheduling downlink control information to a start of a scheduled physical downlink shared channel.

Aspect 11: The method of any of aspects 8 to 10, wherein a subcarrier spacing of first component and the second component is determined based at least in part on a minimum subcarrier spacing of a set of subcarrier spacings, wherein the set of subcarrier spacings includes one or more subcarrier spacings of a set of configured uplink bandwidth parts of a set of uplink carriers in a timing advance group, and wherein the set of subcarrier spacings includes one or more subcarrier spacings of a set of configured downlink bandwidth parts for a set of downlink carriers corresponding to the set of uplink carriers.

Aspect 12: The method of any of aspects 8 to 11, wherein the third component is a maximum value of the timing advance command.

Aspect 13: The method of any of aspects 8 to 12, wherein the third component is determined based at least in part on a minimum subcarrier spacing of a set of subcarrier spacings, wherein the set of subcarrier spacings includes one or more subcarrier spacings of a set of configured uplink bandwidth parts of a set of uplink carriers in a timing advance group, and wherein the set of subcarrier spacings includes one or more subcarrier spacings of a set of configured initial uplink bandwidth parts of an initial uplink bandwidth part configuration message.

Aspect 14: A method of wireless communication performed by a base station (BS), comprising: transmitting, in one or more downlink resources and to a user equipment (UE), a timing advance command in downlink control information; and communicating with the UE in accordance with the timing advance command after an action time period elapses.

Aspect 15: The method of aspect 14, wherein transmitting the timing advance command in the downlink control information comprises: transmitting the timing advance command in the downlink control information of a physical downlink control channel.

Aspect 16: The method of any of aspects 14 to 15, wherein the action time period is defined in a specification.

Aspect 17: The method of any of aspects 14 to 16, wherein the action time period elapses a threshold quantity of time after an end of an uplink resource, wherein the uplink resource overlaps with a last downlink resource, of the one or more downlink resources, in which the timing advance command is received.

Aspect 18: The method of any of aspects 14 to 17, further comprising: receiving, in one or more uplink resources and from the UE, an acknowledgement message as a response to the downlink control information, wherein the action time period elapses a threshold quantity of time after an end of a last uplink resource, of the one or more uplink resources, in which the acknowledgement message is transmitted.

Aspect 19: The method of any of aspects 14 to 18, wherein the action time period is a threshold quantity of symbols or slots.

Aspect 20: The method of any of aspects 14 to 19, wherein a subcarrier spacing of the action time period is based at least in part on a minimum subcarrier spacing of a set of configured uplink bandwidth parts of a set of uplink carriers in a timing advance group of the UE.

Aspect 21: The method of any of aspects 14 to 20, wherein the action time period is based at least in part on at least one of a first component, a second component, and a third component.

Aspect 22: The method of aspect 21, wherein the first component is a minimum required quantity of symbols from an end of a physical downlink control channel that includes the downlink control information to a start of a physical uplink control channel conveying an acknowledgement message.

Aspect 23: The method of any of aspects 21 to 22, wherein the second component is a minimum required quantity of symbols from an end of a scheduling downlink control information to a start of a scheduled physical downlink shared channel.

Aspect 24: The method of any of aspects 21 to 23, wherein a subcarrier spacing of first component and the second component is determined based at least in part on a minimum subcarrier spacing of a set of subcarrier spacings, wherein the set of subcarrier spacings includes one or more subcarrier spacings of a set of configured uplink bandwidth parts of a set of uplink carriers in a timing advance group, and wherein the set of subcarrier spacings includes one or more subcarrier spacings of a set of configured downlink bandwidth parts for a set of downlink carriers corresponding to the set of uplink carriers.

Aspect 25: The method of any of aspects 21 to 24, wherein the third component is a maximum value of the timing advance command.

Aspect 26: The method of any of aspects 21 to 25, wherein the third component is determined based at least in part on a minimum subcarrier spacing of a set of subcarrier spacings, wherein the set of subcarrier spacings includes one or more subcarrier spacings of a set of configured uplink bandwidth parts of a set of uplink carriers in a timing advance group, and wherein the set of subcarrier spacings includes one or more subcarrier spacings of a set of configured initial uplink bandwidth parts of an initial uplink bandwidth part configuration message.

Aspect 27: An apparatus for wireless communication at a device, comprising a processor; memory coupled with the processor; and instructions stored in the memory and executable by the processor to cause the apparatus to perform the method of one or more aspects of aspects 1-13.

Aspect 28: A device for wireless communication, comprising a memory and one or more processors coupled to the memory, the memory and the one or more processors configured to perform the method of one or more aspects of aspects 1-13.

Aspect 29: An apparatus for wireless communication, comprising at least one means for performing the method of one or more aspects of aspects 1-13.

Aspect 30: A non-transitory computer-readable medium storing code for wireless communication, the code comprising instructions executable by a processor to perform the method of one or more aspects of aspects 1-13.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 32: An apparatus for wireless communication at a device, comprising a processor; memory coupled with the processor; and instructions stored in the memory and executable by the processor to cause the apparatus to perform the method of one or more aspects of aspects 14-26.

Aspect 33: A device for wireless communication, comprising a memory and one or more processors coupled to the memory, the memory and the one or more processors configured to perform the method of one or more aspects of aspects 14-26.

Aspect 34: An apparatus for wireless communication, comprising at least one means for performing the method of one or more aspects of aspects 14-26.

Aspect 35: A non-transitory computer-readable medium storing code for wireless communication, the code comprising instructions executable by a processor to perform the method of one or more aspects of aspects 14-26.

Aspect 36: A non-transitory computer-readable medium storing a set of instructions for wireless communication, the set of instructions comprising one or more instructions that, when executed by one or more processors of a device, cause the device to perform the method of one or more aspects of aspects 14-26.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors coupled to the memory, the one or more processors configured to cause the UE to:
receive, in one or more downlink resources, a timing advance command in downlink control information, wherein an action time period commences based on the receipt of the timing advance command; and
implement the timing advance command upon the action time period elapsing, the action time period elapsing a threshold quantity of time after an uplink resource associated with the one or more downlink resources.

2. The UE of claim 1, wherein the one or more processors, to cause the UE to receive the timing advance command in the downlink control information, are configured to cause the UE to:
receive the timing advance command in the downlink control information of a physical downlink control channel.

3. The UE of claim 1, wherein the action time period is defined in a specification.

4. The UE of claim 1, wherein the action time period elapses the threshold quantity of time after an end of the uplink resource, wherein the uplink resource overlaps with a last downlink resource, of the one or more downlink resources, in which the timing advance command is received.

5. The UE of claim 1, wherein the one or more processors are further configured to cause the UE to:
transmit, in one or more uplink resources, an acknowledgement message as a response to the downlink control information,
wherein the uplink resource associated with the one or more downlink resources is a last uplink resource, of the one or more uplink resources, in which the acknowledgement message is to be transmitted, and
wherein the action time period elapses the threshold quantity of time after an end of the last uplink resource.

6. The UE of claim 1, wherein the action time period is a threshold quantity of symbols or slots.

7. The UE of claim 1, wherein a subcarrier spacing of the action time period is based at least in part on a minimum subcarrier spacing of a set of configured uplink bandwidth parts of a set of uplink carriers in a timing advance group of the UE.

8. The UE of claim 1, wherein the action time period is based at least in part on at least one of a first component, a second component, and a third component.

9. The UE of claim 8, wherein the first component is a minimum required quantity of symbols from an end of a physical downlink control channel that includes the downlink control information to a start of a physical uplink control channel conveying an acknowledgement message.

10. The UE of claim 8, wherein the second component is a minimum required quantity of symbols from an end of a scheduling downlink control information to a start of a scheduled physical downlink shared channel.

11. The UE of claim 8, wherein a subcarrier spacing of the first component and the second component is determined based at least in part on a minimum subcarrier spacing of a set of subcarrier spacings,
wherein the set of subcarrier spacings includes one or more subcarrier spacings of a set of configured uplink bandwidth parts of a set of uplink carriers in a timing advance group, and
wherein the set of subcarrier spacings includes one or more subcarrier spacings of a set of configured downlink bandwidth parts for a set of downlink carriers corresponding to the set of uplink carriers.

12. The UE of claim 8, wherein the third component is a maximum value of the timing advance command.

13. The UE of claim 8, wherein the third component is determined based at least in part on a minimum subcarrier spacing of a set of subcarrier spacings,
   wherein the set of subcarrier spacings includes one or more subcarrier spacings of a set of configured uplink bandwidth parts of a set of uplink carriers in a timing advance group, and
   wherein the set of subcarrier spacings includes one or more subcarrier spacings of a set of configured initial uplink bandwidth parts of an initial uplink bandwidth part configuration message.

14. A base station (BS) for wireless communication, comprising:
   a memory; and
   one or more processors coupled to the memory, the one or more processors configured to cause the BS to:
      transmit, in one or more downlink resources and to a user equipment (UE), a timing advance command in downlink control information; and
      communicate with the UE in accordance with the timing advance command upon an action time period elapsing, the action time period elapsing a threshold quantity of time after an uplink resource associated with the one or more downlink resources.

15. The BS of claim 14, wherein the one or more processors, to transmit the timing advance command in the downlink control information, are configured to cause the BS to:
   transmit the timing advance command in the downlink control information of a physical downlink control channel.

16. The BS of claim 14, wherein the action time period is defined in a specification.

17. The BS of claim 14, wherein the action time period elapses the threshold quantity of time after an end of the uplink resource, wherein the uplink resource overlaps with a last downlink resource, of the one or more downlink resources, in which the timing advance command is received.

18. The BS of claim 14, wherein the one or more processors are further configured to cause the BS to:
   receive, in one or more uplink resources and from the UE, an acknowledgement message as a response to the downlink control information,
   wherein the uplink resource associated with the one or more downlink resources is a last uplink resource, of the one or more uplink resources, associated with the acknowledgement message, and
   wherein the action time period elapses the threshold quantity of time after an end of the last uplink resource.

19. The BS of claim 14, wherein the action time period is a threshold quantity of symbols or slots.

20. The BS of claim 14, wherein a subcarrier spacing of the action time period is based at least in part on a minimum subcarrier spacing of a set of configured uplink bandwidth parts of a set of uplink carriers in a timing advance group of the UE.

21. The BS of claim 14, wherein the action time period is based at least in part on at least one of a first component, a second component, and a third component.

22. The BS of claim 21, wherein the first component is a minimum required quantity of symbols from an end of a physical downlink control channel that includes the downlink control information to a start of a physical uplink control channel conveying an acknowledgement message.

23. The BS of claim 21, wherein the second component is a minimum required quantity of symbols from an end of a scheduling downlink control information to a start of a scheduled physical downlink shared channel.

24. The BS of claim 21, wherein a subcarrier spacing of the first component and the second component is determined based at least in part on a minimum subcarrier spacing of a set of subcarrier spacings,
   wherein the set of subcarrier spacings includes one or more subcarrier spacings of a set of configured uplink bandwidth parts of a set of uplink carriers in a timing advance group, and
   wherein the set of subcarrier spacings includes one or more subcarrier spacings of a set of configured downlink bandwidth parts for a set of downlink carriers corresponding to the set of uplink carriers.

25. The BS of claim 21, wherein the third component is a maximum value of the timing advance command.

26. The BS of claim 21, wherein the third component is determined based at least in part on a minimum subcarrier spacing of a set of subcarrier spacings,
   wherein the set of subcarrier spacings includes one or more subcarrier spacings of a set of configured uplink bandwidth parts of a set of uplink carriers in a timing advance group, and
   wherein the set of subcarrier spacings includes one or more subcarrier spacings of a set of configured initial uplink bandwidth parts of an initial uplink bandwidth part configuration message.

27. A method of wireless communication performed by a user equipment (UE), comprising:
   receiving, in one or more downlink resources, a timing advance command in downlink control information, wherein an action time period commences based on the receipt of the timing advance command; and
   implementing the timing advance command upon the action time period elapsing, the action time period elapsing a threshold quantity of time after an uplink resource associated with the one or more downlink resources.

28. The method of claim 27, wherein receiving the timing advance command in the downlink control information comprises:
   receiving the timing advance command in the downlink control information of a physical downlink control channel.

29. A method of wireless communication performed by a base station (BS), comprising:
   transmitting, in one or more downlink resources and to a user equipment (UE), a timing advance command in downlink control information; and
   communicating with the UE in accordance with the timing advance command upon an action time period elapsing, the action time period elapsing a threshold quantity of time after an uplink resource associated with the one or more downlink resources.

30. The method of claim 29, wherein transmitting the timing advance command in the downlink control information comprises:
   transmitting the timing advance command in the downlink control information of a physical downlink control channel.

* * * * *